(12) United States Patent
Roberts, Jr. et al.

(10) Patent No.: US 6,661,634 B2
(45) Date of Patent: Dec. 9, 2003

(54) DIGITAL SUBSCRIBER LINE ALTERNATING CURRENT EMI/RFI BROADBAND NOISE ELIMINATOR

(75) Inventors: John A. Roberts, Jr., Glendale, AZ (US); Bruce A. Phillips, Erie, CO (US); Carlton Francis Scott Schneider, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 10/042,672

(22) Filed: Jan. 8, 2002

(65) Prior Publication Data

US 2003/0127913 A1 Jul. 10, 2003

(51) Int. Cl.[7] .............................................. H02H 1/00
(52) U.S. Cl. ...................................... 361/119; 361/111
(58) Field of Search ........................ 361/118–119, 56, 361/91, 111

(56) References Cited

U.S. PATENT DOCUMENTS

| | | | | |
|---|---|---|---|---|
| 4,802,055 A | * | 1/1989 | Beckerman | 361/111 |
| 4,901,183 A | * | 2/1990 | Lee | 361/111 |
| 5,195,232 A | * | 3/1993 | Frederick | 29/602.1 |
| 5,321,373 A | * | 6/1994 | Shusterman et al. | 333/12 |
| 5,675,468 A | | 10/1997 | Chang | 361/119 |
| 5,780,775 A | | 7/1998 | Yu | 174/135 |
| 6,252,754 B1 | | 6/2001 | Chaudhry | 361/111 |

* cited by examiner

Primary Examiner—Gregory J. Toatley, Jr.
Assistant Examiner—Boris Benenson
(74) Attorney, Agent, or Firm—Marsh Fischmann & Breyfogle LLP (57) ABSTRACT

The present invention provides an apparatus and method for filtering electrical power to and from an electrical appliance to reduce or eliminate electromagnetic interference (EMI) and radio frequency interference (RFI). In one embodiment, an electrical outlet strip apparatus is provided for interconnection between an AC power source and an electrical appliance that provides transient voltage surge suppression for the appliance while substantially reducing or eliminating EMI from the AC power source from reaching the appliance. Additionally, the apparatus reduces or eliminates EMI produced by the appliance from propagating into the AC power system. The apparatus and method utilize a multistage EMI filter to filter the electrical power. In particular, the electrical power is filtered in a broadband range associated with digital subscriber line (DSL) systems to provide for improved DSL system performance.

16 Claims, 5 Drawing Sheets

DIGITAL SUBSCRIBER LINE ALTERNATING CURRENT EMI/RFI BROADBAND NOISE ELIMINATOR

FIELD OF THE INVENTION

The present invention is related to an electrical outlet strip and, more particularly, to a combination electrical outlet strip which comprises a transient voltage surge suppression (TVSS) protection device with electromagnetic interference noise blocking capabilities to and from an attached electrical appliance.

BACKGROUND OF THE INVENTION

Many consumer electronic goods used today contain electronic circuitry which includes miniaturized components and electrical contacts which, due to their diminutive size and the materials from which they are formed, are very susceptible to stray electrical energy caused by voltage transients and electromagnetic interference (EMI). Voltage transients typically occur on the incoming electrical power lines and are represented as a surge or spike in the amplitude of the incoming voltage. In a transient situation, large voltage potentials (i.e., significantly higher than normal operating voltage) may be present over a short time period. These voltage transients can severely damage or destroy electrical components or contacts, thereby rendering the electrical equipment inoperative.

EMI is an unwanted electrically transmitted signal that can propagate through electrical equipment and components interfering with their proper operation by altering their normal operating parameters. Examples of EMI interference include noise on the phone line, erratic data bits on a digital transmission, interference lines across a television screen, in addition to numerous other malfunctions. EMI generally appears in two forms: radiated and conducted. Radiated interference (i.e., Radio Frequency Interference, RFI) is interference that travels through the air from a source to a receiving device and is often the by-product of electromagnetic fields around external wiring. Conducted interference is an undesirable electromagnetic signal traveling on a medium such as an AC electrical power line or 'wire' which may be conducted into sensitive electronic equipment and cause malfunctions or otherwise affect operation of the equipment. The conducted EMI may originate from a source directly attached to the wire or it may originate as radiated EMI (i.e., RFI) that is received by and propagated along the wire. In this regard, the wire may act as an antenna that is able to transmit and receive RFI. Further, conducted EMI appears in two forms, common-mode and differential-mode. Common mode EMI occurs when unwanted signal(s) consisting of multiple currents flow in the same direction along the conducting wire. Differential-mode EMI interference occurs when unwanted signal(s) consisting of multiple currents flow in opposite directions along the conducting wire. Finally, EMI can occur in either broadband or narrowband frequencies. Broadband interference is interference which has broad spectral energy distribution exhibited over a wide frequency range and is generally a result of sudden changes in voltage or current. Narrowband interference is interference which has its principal spectral energy confined to a specific frequency or frequencies. This type of interference is usually produced by an oscillator circuit which contains energy only at the frequency of oscillation and harmonics of that frequency. In normal usage, the magnitude of the interference will depend on the bandwidth of the receiver used to detect the signals.

An important source of both conducted and radiated EMI is electrical equipment coupled to AC electrical lines such as computers, switching power supplies, and electrical devices which utilize electrical motors, such as refrigerators, air conditioners and treadmills, etc. In addition, these electronic devices can also produce radiated EMI which may be seen in other nearby electrical devices. As noted above, once EMI from an electrical device is conducted into an electrical wiring circuit, the wiring may act as an antenna and "broadcast" the conducted EMI as RFI throughout a structure.

There are generally two different issues present regarding EMI and electronic devices, the EMI given off by a particular device and the EMI received by the device. Over the last several years, consumer electronic devices have become more sophisticated with the use of microprocessors whose functioning requires clean electrical power free of noise and frequency components that can interfere with their operation. Accordingly, these devices have become more susceptible to EMI problems. Susceptibility is defined as the characteristic which causes equipment to malfunction or exhibit an undesirable response when it is subjected to electromagnetic interference voltages or fields.

SUMMARY OF THE INVENTION

It is, therefore, a primary objective of the present invention to provide an apparatus that reduces the introduction of conducted EMI into an AC power system.

It is a further objective of the present invention to provide means to reduce conducted EMI in digital data transfer sensitive frequencies.

The inventors of the present invention have recognized that many currently used consumer electronic appliances and, particularly, motor driven devices produce EMI in a series of impulse spikes which are generally conducted into the AC power system. Further, the inventors have discovered that these EMI impulse spikes are often of such a magnitude that some consumer digital devices cannot function properly even when there is an EMI filter between the digital device and its AC power supply (i.e., outlet). The inventors have recognized that digital data transfer devices are especially susceptible to conducted EMI interference which often results in poor or lost data transfer and/or disconnection. In particular, broadband data transmissions in the frequency range of 25 kHz to 12 MHz such as telephony digital subscriber line (DSL) systems are highly susceptible to EMI interference produced by motor driven appliances. The inventors have recognized that the impulse spikes created by motor driven devices when switched on or off and, in some cases, created continuously as they operate are disruptive to the operation of data transfer devices and that suppression of these EMI impulse spikes from motor driven appliances before they are conducted into an AC wiring circuit is more effective than filtering the AC power as it is received by the digital device.

In light of these recognitions and in line with the above objectives, the present invention embodies an electrical outlet strip apparatus for interconnection between an AC power source and an electrical appliance that provides transient voltage surge suppression for the appliance and substantially reduces EMI to and from the appliance. The apparatus comprises a first input line, a second input line and a ground line which are adapted to be connected to an existing AC source (e.g., AC outlet). The apparatus further comprises at least one electrical connector having a first, second and third conductors connected to the first input line, the second input line and the ground line, respectively. This connector is operative to interconnect an electrical appliance to the apparatus and thus to the AC power source. At least one voltage surge absorption element is interconnected between at least two of the lines for diverting transient voltages, accordingly, this voltage surge absorption element is disposed between the AC power source and the electrical connector(s). Finally, the outlet strip apparatus contains a multi-stage EMI filter interconnected in series with the first and second input line and grounded to the ground line. The multi-stage EMI filter is disposed between the AC power source and the electrical connector such that electricity from the AC power source to the appliance may be filtered and such that electricity returning from the appliance to the AC power system may again be filtered.

As noted above, the apparatus' input lines are interconnectable to an AC power source. In one embodiment the first input line is connectable to an AC power line while the second input line is connectable to an AC neutral line. In this embodiment, the apparatus may be configured such that it uses a 120 VAC current. Alternatively, both the first and second input lines may be connectable to an AC power line such that the apparatus is able to carry 220 VAC, as is standard in many European countries, as well as a standard for some electronic goods, such as direct current motor treadmills, dryers etc. As will be appreciated, in either of these embodiments, the apparatus will be adapted to interconnect with an appropriate outlet (i.e., 120 VAC or 220 VAC). Accordingly, depending on what configuration is used, the apparatus' electrical connector will be configured such that it interconnects electrical appliances which use the correct voltage.

The apparatus' voltage surge absorption element typically will connect at least two of the apparatus' lines (i.e., the first input line, the second input line and the ground line). As will be appreciated, one end of the voltage surge absorption element will generally be attached to the AC power line such that if a large transient voltage (i.e., spike) enters the apparatus, a predetermined resistance within the voltage surge absorption element will be exceeded, allowing the voltage spike to be diverted to another line (e.g., ground or neutral), thus by-passing and protecting the attached electrical appliance. The voltage surge absorption element may comprise any element that provides sufficient diversion of transient voltages such as a thyrector, a spark-gap or a varistor. In a preferred embodiment the voltage surge absorption element comprises a metal oxide varistor. In addition, multiple varistors may be used to connect all of the lines. For example, a 120 VAC system may use three varistors where the first varistor is connected between the AC power line and the neutral line (l-n), another varistor is connected between the AC power line and ground (l-g) and a third varistor is used to connect the neutral line to the ground line (n-g). These varistors may be chosen depending on a proposed application for the apparatus. For example, 220 VAC systems may utilize a 250 volt 10 amp (V250LA10), whereas for 120 VAC systems a 130 volt 20 amp (V130LA20) varistor may be used.

The apparatus' multi-stage EMI filter will generally be disposed between the voltage surge absorption element and the electrical connector. A multiple stage EMI filter is used to provide added EMI attenuation of conducted EMI originating from the attached appliance. By passing the conducted EMI through multiple filter stages it may be substantially reduced or eliminated prior to reentering the AC power system. As will be appreciated, this prevents this EMI from being conducted into a digital device attached elsewhere in the AC power system and also prevents the AC power system form transmitting this EMI as RFI throughout a structure.

In a preferred embodiment, the multi-stage EMI filter will be a passive EMI filter. Passive EMI filters typically comprise a plurality of inductors connected in series with the input lines (i.e., AC power line and neutral line in a 120 system and the two AC power lines in a 220 VAC system) and may further contain a plurality of capacitors connected between the two input lines and/or to ground. In one embodiment, this passive multi-stage EMI filter will comprise an EMI filter which is isolated in a metal case. In this embodiment, the metal case may be grounded to the system's ground line. This 'sealed' EMI filter arrangement further reduces noise in the system, since any electromagnetic radiation entering the metal case will be unable to radiate and will eventually be absorbed to ground.

Generally, the multi-stage EMI filter will be chosen from a set of filters that are operative to suppress and substantially reduce common mode (i.e., line-to-ground) and differential mode (i.e., line-to-line) EMI in a predetermined frequency range to increase the total amount of EMI suppressed. When the apparatus is designed for use in suppressing EMI such that digital communications are not interrupted, the filter is operative to suppress EMI in a range between 25 kHz and 20,000 kHz and to attenuate common mode and differential mode EMI in a range between 3 decibels and 65 decibels. Generally, the filter will suppress or attenuate higher amounts of EMI at higher frequencies. For example, an EMI filter may only attenuate EMI by 3 decibels at 100 kHz, whereas it may attenuate between 55 and 65 decibels for all frequencies between 500 kHz. and 20,000 kHz. In this regard, the filter may be operative to effectively eliminate EMI caused by motor driven appliances in a frequency range where consumer digital devices are highly susceptible. However, it will be appreciated that it is possible to utilize EMI filters which attenuate EMI in other frequency ranges in different settings.

In accordance with another aspect of the present invention, a method is provided to filter EMI from AC power to and from an electrical appliance while providing transient voltage surge suppression for that appliance. The method is performed by first interconnecting an EMI filter and a transient voltage surge suppression element (TVSS) between an appliance and an AC power source. Once the EMI filter and TVSS are interconnected, transient voltages from the AC power source having an amplitude greater than a predetermined maximum value are diverted such that these transient voltages by-pass the electrical appliance. The method also includes the step of passing the 'incoming' electricity from the AC power source through an EMI filter such that EMI contained therein may be attenuated prior to reaching the electrical appliance. Finally, the electricity returning from the electrical appliance is also passed through the EMI filter to attenuate any EMI that may have been generated by the electrical appliance itself. For example, where the attached appliance is a motor driven appliance (e.g., a fan) initially switching the fan on may create an impulse spike (i.e., conducted EMI) in the return current. As will be appreciated, if not filtered, this impulse spike may be conducted or radiated to other electrical devices upon reentering the AC power system (e.g., a home's wiring system). Passing this return current through the EMI filter may attenuate those impulse spikes to tolerable levels.

The passing steps (i.e., to and from the appliance) may further comprise passing the electricity through a multistage EMI filter to provide improved filtering of the electricity. Preferably, when the present method is used for reducing or eliminating EMI that may interfere with a telephony digital subscriber line, the electricity will be filtered to substantially reduce or eliminate EMI occurring in the frequency range between 25 kHz and 20,000 kHz.

DETAILED DESCRIPTION

As noted above, as consumer electronics have become more sophisticated they have become more susceptible to EMI problems. In particular data transmission devices have in recent years become much more complex and among the most EMI susceptible devices. Digital subscriber lines (DSL, which hereinafter shall include ASDL, XDSL, VDSL, etc.) which are used to transmit signals to a receiving location (hereinafter a home) through existing telephonic wires are particularly EMI susceptible. DSL utilizes analog signals over a broadband frequency from about 100 kHz to about 30,000 kHz to transfer data. These analog signals carry the data to and from a user's home and must be encoded on the sending end and decoded at the receiving end. The decoding or demodulating unit at the home is generally plugged into the home's AC power system where it may encounter conducted EMI. The ability of the demodulating unit to decode data signals in the presence of disturbances such as EMI can be extremely difficult as these data signals attenuate as they a traverse across a medium. The effects of noise in the demodulation unit impairs the detection of the smallest levels of the signal, resulting in lost or corrupted data. Generally DSL information traveling over broadband frequencies is organized into packets of information. If one or more of these packages is corrupted or lost, the system will either have to re-request the packet be sent or continue without the packet. For example, in the case of a continuous stream of data (e.g., video), the system cannot go back and re-request corrupted data. The resulting effect is video freezing, blocking, and/or loss of audio. In the case where the data transfer is not time dependent (e.g., internet use) corrupted or lost packets may be re-requested, however, this re-requesting of individual packets results in considerably slowing the transfer of data from a source to a user.

Since DSL is transmitted over a broad frequency band, it is susceptible to both broadband and narrowband EMI interference occurring in the DSL frequency range. In particular, voltage impulses from motor driven appliances can produce broadband conducted EMI which may adversely affect DSL transmissions or even result in disconnection of the DSL system. Motor driven appliance impulse spikes generally occur when the are switched on and off, however, motor driven appliances which utilize DC motors often produce a continuous series of impulse spikes as the AC current is rapidly switched on and off in the appliance to produce a DC current. These impulse spikes are often of sufficient amplitude that once they are conducted into the AC wiring of a home they can affect a DSL system even if that DSL system is utilizing an EMI filter to 'clean' the electricity it is using.

The present invention presents a novel combination of elements to provide an outlet strip for interconnection between an AC power system and an appliance that produces impulse spikes in the return current to the AC power system. The outlet strip is constructed such that it is able to attenuate EMI created by these appliances to a sufficient level prior to introduction into an AC Power System to protect DSL systems connected elsewhere to the AC power system.

Figure 1:
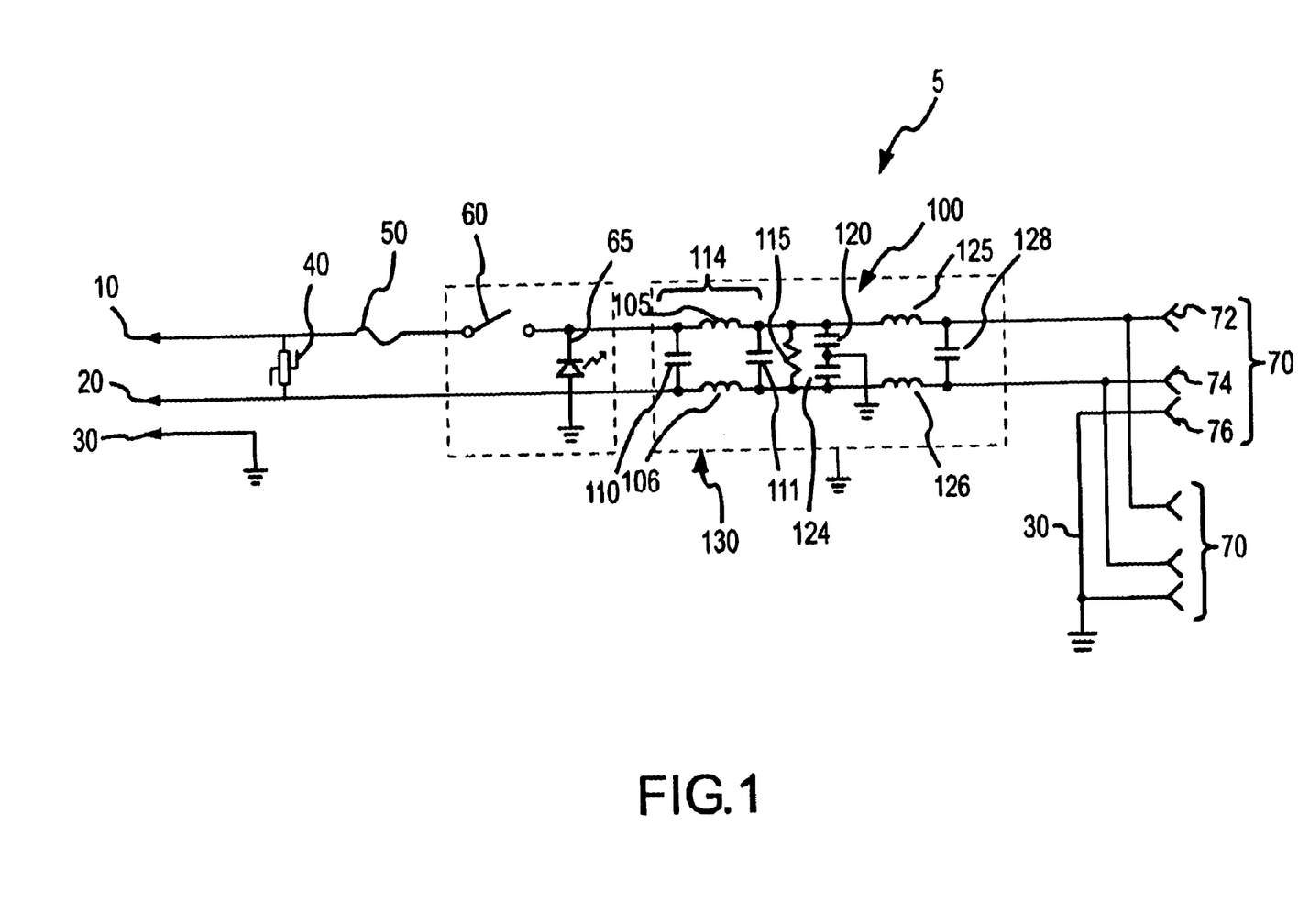
FIG. 1 shows an electrical schematic of the present invention for use with a 120 volt AC system.

FIG. 1 shows a schematic diagram of the DSL alternating current EMI/RFI noise eliminator in accordance with the present invention. As shown, the diagram depicts the electrical schematic of the apparatus 5 for a 120 volt AC system. As shown, the apparatus has a first input line 10, a second input line 20, and a ground line 30. The first input line 10 is connectable to an AC power line while the second input line 20 is connectable to an AC neutral line. Connected between these lines 10, 20 is a voltage surge absorption element 40 which is shown as a metal oxide varistor having a 130 voltage 20 amp rating. The voltage surge absorption element 40 operates such that a voltage received on the first input line 10 having a voltage greater than 130 volts will overcome the internal resistance of the voltage surge absorption element 40. This allows the incoming voltage surge or spike to cross the voltage surge absorption element 40 to the second input line 20, which is attached to the AC neutral line, and thus bypass the rest of the system 5.

Attached in series to the first input line 10 is a thermal fuse 50. This fuse 50 operates such that if an over current condition causes the temperature developed across the thermal fuse to exceed its current limit rating on the input line 10, the fuse trips and separates the input line's 10 connection with the rest of the apparatus 5, thus cutting the apparatus' 5 power supply. This fuse 50 is designed such that it may be manually reset upon cooling.

As shown, the schematic includes two electrical outlets 70 having a first conductor 72 attached to the first input line 10, a second conductor 74 attached to the second input line 20 and a third conductor 76 attached to the ground line 30. These outlets 70 are capable supplying a nominal 120 VAC and are configured to receive electrical plugs from common household electrical appliances which require nominal 120 VAC.

The system 5 also includes a power switch 60 which is used to manually open and close the first input line 110, thereby selectively connecting and disconnecting the rest of the system 5 to the AC power line 10. The switch 60 may be any sort of electrical switch that is rated for 120 volt systems such as a rocker switch, toggle switch, etc. In the illustrated embodiment, the switch 60 is an illuminated rocker switch that has integrated indicator light 65. As shown, the indicator light 65 is attached to the first input line 10 after the power switch 60 and interconnected with the second input line 20 and ground 30. In this configuration, when the power switch 60 is closed such that the first input line 10 is connected to the rest of the apparatus 5, the indicator light 65 illuminates indicating the apparatus 5 is 'on.'

The system 5 also includes a passive multi-stage EMI filter 100 between the power switch 60 and the outlets 70 and interconnected in series with the first input line 10 and the second input line 20. Passive EMI/RFI filters typically consist of inductors, capacitors and, in some cases, resistors in selected combinations designed to pass or reject selected frequencies. Low-pass filters typically pass all frequencies below the cut off frequency; high-pass filters pass all frequencies above a selected cut off frequency; band-pass filters pass a selected band of frequencies while rejecting those above and below the band; and band-stop filters pass all frequencies except those within a selected range. Filter selection is accomplished using multiple criteria; for example, voltage (both line-to-line and line-to-ground) of the system and current that will pass through the filter. The second criteria is frequency: both the pass band and the stop band may be specified. The pass band must be large enough to ensure that the filter will allow the system in which it is installed to operate properly while still providing the desired filtering of EMI. Third, insertion loss must be considered, which measures in decibels the ratio between the power received at a specific load before and after the insertion of the filter at a given frequency. This measurement is an indication of the degree of attenuation provided by the filter at that frequency. Preferably, the filter will provide over 60 decibels of attenuation over the most sensitive frequency ranges. For any filter design, insertion loss can be increased with a commensurate increase in its size and weight. As will be appreciated, in the present invention the filter had to be chosen from a group of filters capable to fit within the confines of a power strip for use with consumer electronics. One filter which matches the above criteria is the Preo 10ER11 20 amp Power line EMI filter available from Eastek International Corp, of Buffalo Grove, Ill. This particular filter provides attenuation of 3–65 dB over a frequency range from 100 kHz to 20,000 kHz as shown below.

| Frequency kHz | 100 | 150 | 200 | 500 | 1000 | 5000 | 10,000 | 20,000 |
|---|---|---|---|---|---|---|---|---|
| Noise Attenuation Insertion Loss | 3 | 25 | 40 | 60 | 65 | 65 | 65 | 55 |

As shown, the EMI filter 100 is a multiple stage filter and more particularly a double 'O' pad filter. The filter comprises a first set of inductors 105, 106 hooked in series with the first input line 10 and the second input line 20 respectively. A first pair of capacitors 110, 111 are interconnected to the first input line 10 and the second input line 20 on either side of the first pair of inductors 105, 106. Additionally, a resistor 115 is connected between the first input line 10 and the second input line 20. Next, a second set of capacitors 120, 121 are interconnected in series between the first input line 10 and the second input line 20; between these capacitors 120, 121 there is a connection to ground 30. A second set of inductors 125, 126 are again connected in series with the first input line 10 and second input line 20, respectively. Finally, a capacitor 128 is connected between the first input line 10 and the second input line 20 after the second set of inductors 125, 126. Inductors 105, 106 along with capacitors 110 and 111 and resistor 115 define the filter's first stage 114 while inductors 125, 126 and capacitors 120, 121 and 128 represent the filter's second stage 118. Additionally as shown, each stage 114, 118 further define two sub-filters, as the each stage's capacitors attenuate differential mode or noise while the inductors 105, 106, 125, 126 attenuate common mode noise. Finally, the above-noted circuitry for the EMI filter 100 is enclosed in a grounded metal case 130.

This grounded metal case 130 is helps isolate any electromagnetic radiation inside the case 130 and prevent it from radiating into the system 5. As will be appreciated, use of the two stage metallically isolated EMI filter 100 significantly reduces conducted EMI from appliances attached to the outlets 70 beyond that which is achieved by the use of a single stage non-metallically isolated EMI filter.

Figure 2:
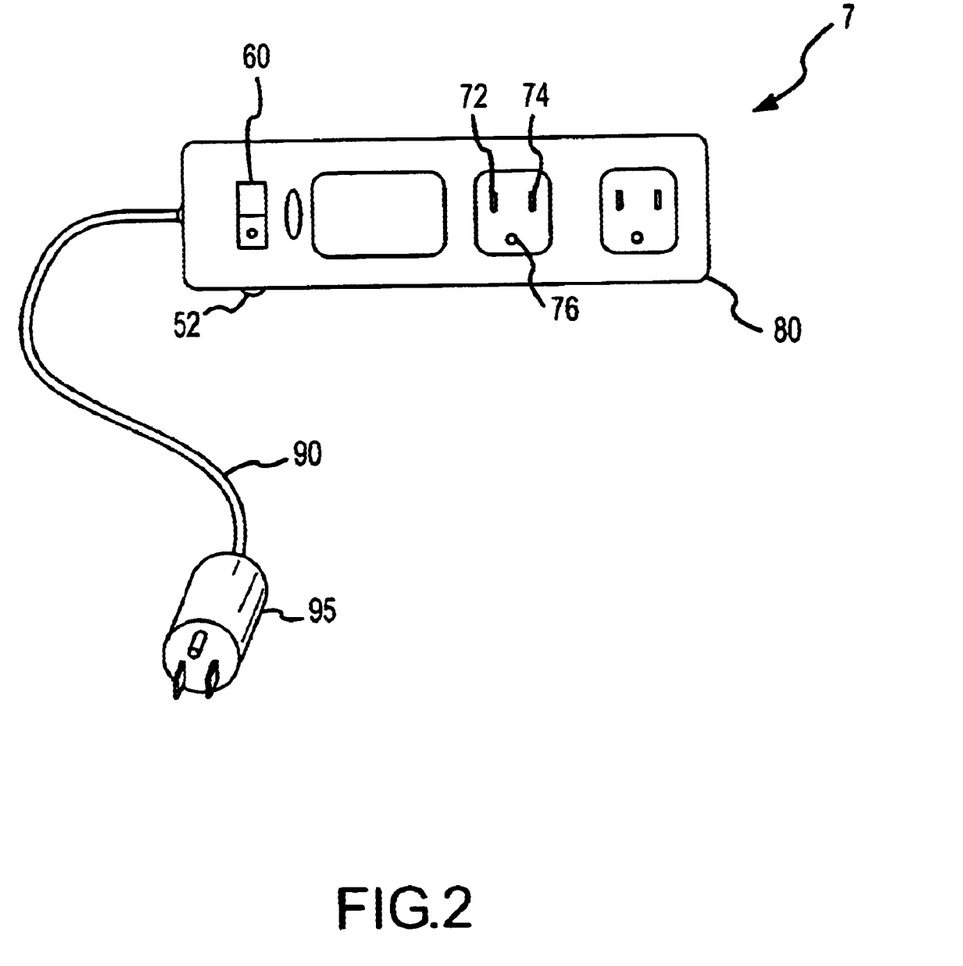
FIG. 2 shows a plan view drawing of a power strip according to the present invention.
Figure 3:
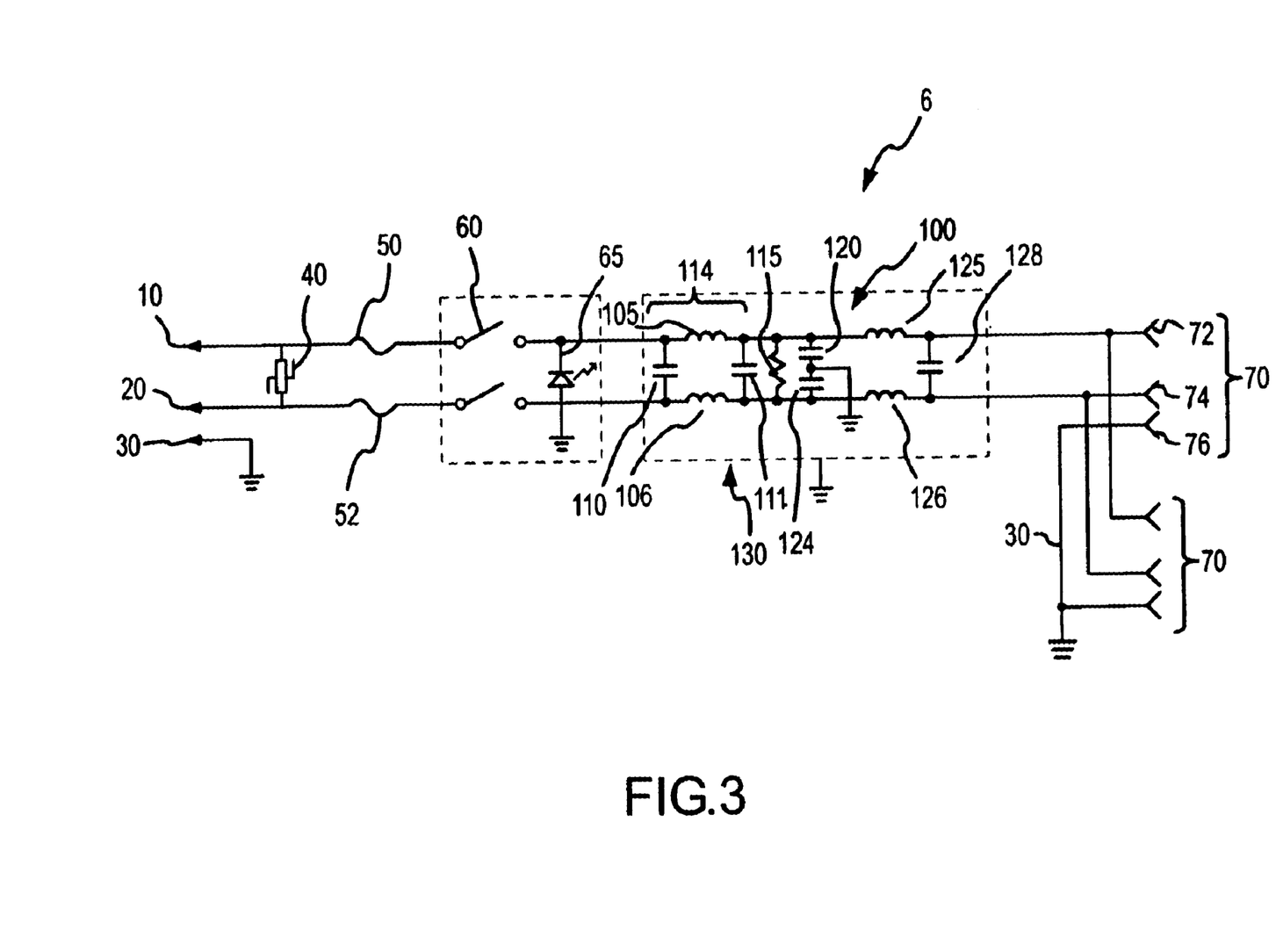
FIG. 3 shows an electrical schematic of the present invention for use with a 220 volt AC system.

FIG. 2 shows an assembled view of the EMI noise reducing apparatus 5. The apparatus 5 contains a plastic casing 80 which houses the circuitry shown in FIG. 1. The outlets 70 are shown configured on the exterior of the casing 80 with the first, second and third conductors 72, 74 and 76 available to receive an electrical plug. Additionally, the illuminated power switch 60 is shown, along with a reset button 52 attached to the fuse 50. Finally, the apparatus 5 contains an electrical cable 90 and a 120 VAC power plug 95 configured to plug into a standard US outlet. The electrical cable 90 contains an aluminum shielding of 14 gauge aluminum to reduce RFI from transmitting FIG. 3 shows a schematic of an apparatus 6 similar to the apparatus 5 shown in FIG. 1. Apparatus 6 is configured to operate with 220 VAC systems as are standard in many European countries and standard for some high power need electronic goods in the United States. In this regard, the first input line 10 and second input line 20 are both connected to an AC power line thus necessitating a fuse 50 be hooked in series with the first input line 10 and a fuse 52 be hooked in series with the second input line 20. Likewise, the power switch 60 comprises a switch that opens and closes both the first input line 10 and the second input line 20.

Figure 4A:
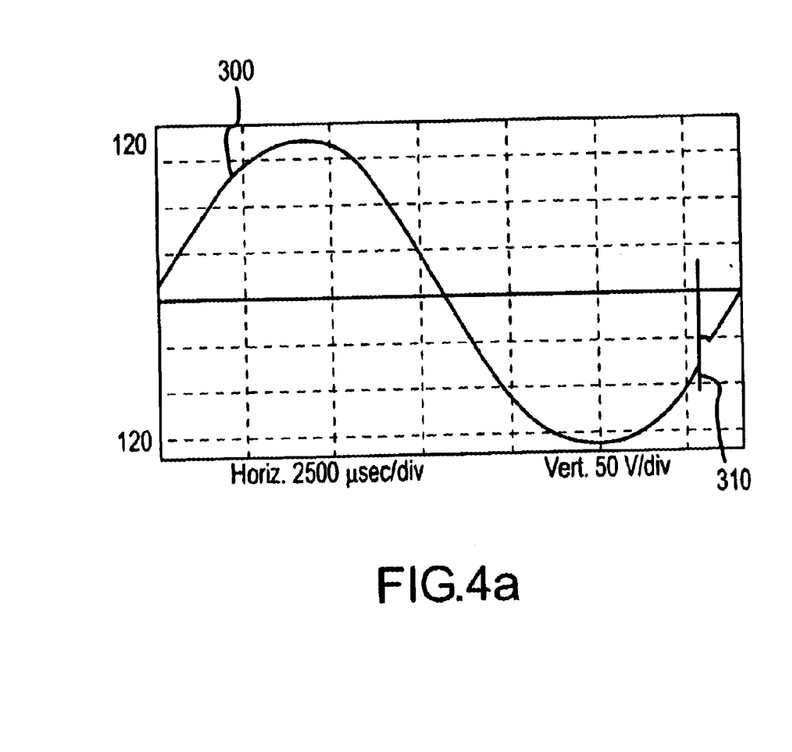
FIG. 4a shows an electric waveform from an AC power supply containing an EMI impulse.
Figure 4B:
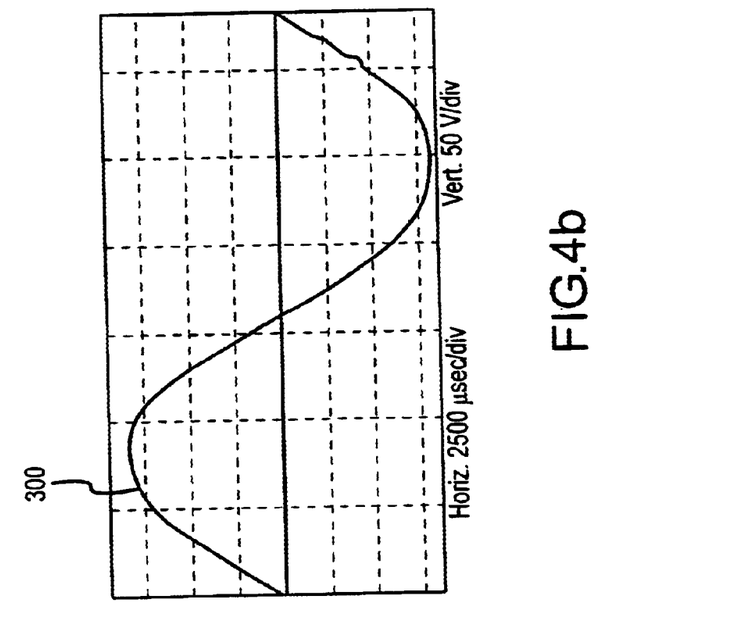
FIG. 4b shows the electric waveform of FIG. 4a after passing through the apparatus of FIG. 1.
Figure 5A:
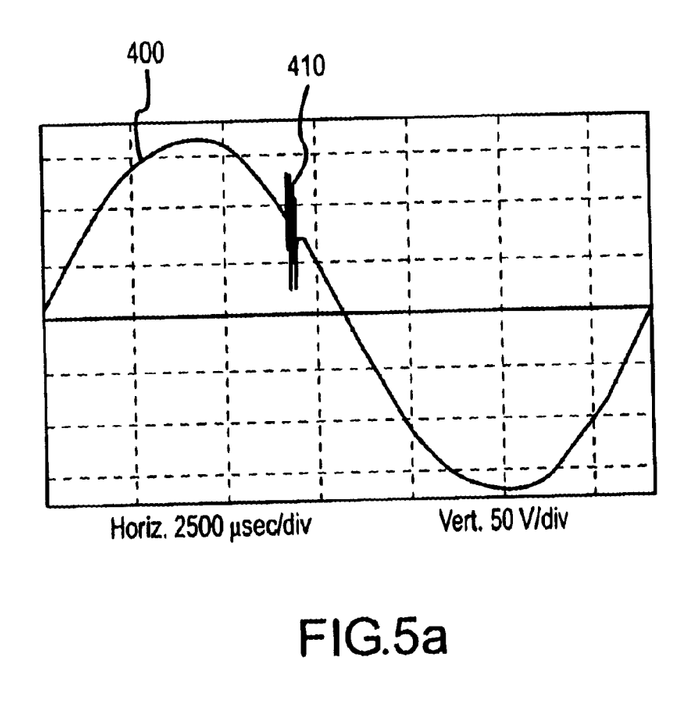
FIG. 5a shows an electric waveform returning from an electrical appliance attached to the apparatus of FIG. 1 containing an EMI impulse.
Figure 5B:
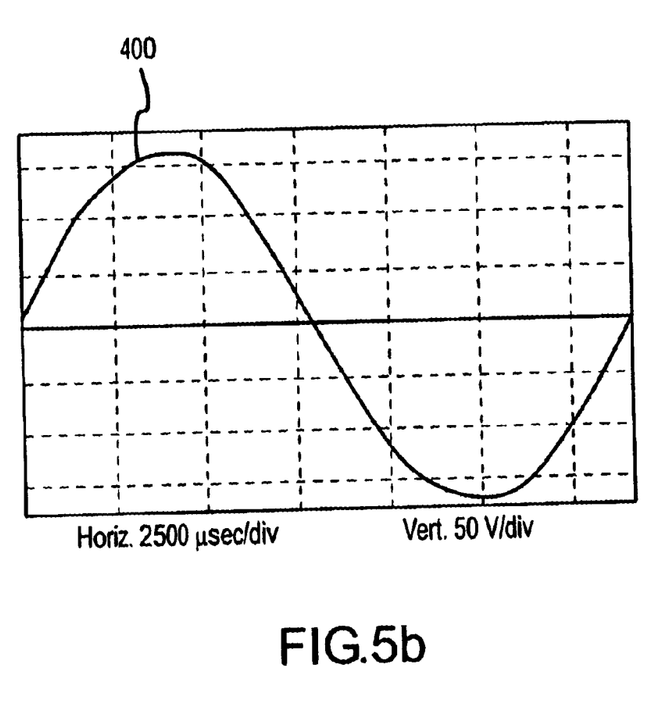
FIG. 5b shows the electric waveform of FIG. 5a after passing through the apparatus of FIG. 1.

Referring to FIGS. 1, 4a–b and 5a–b operation of the apparatus 5 in a 120 VAC system is described. FIG. 4a shows one cycle of a voltage waveform 300 as received on the apparatus' input line 10 from an AC power supply. As shown, the waveform's voltage alternates between two phases slightly greater than 120 volts. As there is no voltage over 130 volts present, the internal resistance of the 130V voltage surge absorption element 40 is not overcome. Therefore, the incoming electricity does not 'short' to the second input line 20 (i.e., neutral line) and instead proceeds into the EMI filter 100. As shown in FIG. 4a, the incoming waveform 300 contains a section of noise 310 (i.e., EMI). As the waveform passes through the EMI filter's first stage 114, common mode interference within the waveform 300 is attenuated by inductors 105, 106 and differential mode interference within the waveform 300 is attenuated by the capacitors 110, 111. Once the waveform passes through the first stage 114, it enters the second stage 118, where the common mode and differential mode interference are again attenuated. As shown in FIG. 4b, the waveform 300 leaving the filter 100 is substantially free of noise 310. The electricity then passes through one of the outlets 70 an into an attached appliance (not shown). The electricity returns on the second input line 20 from the appliance as shown in FIG. 5a. FIG. 5a shows a voltage waveform 400 of electricity returning from an attached appliance. As shown, the appliance has created a broadband impulse spike 410 (e.g., conducted EMI) in the previously filtered waveform 300. Left un-attenuated, the impulse spike 410 would be conducted into the AC power system though the second input line 20 where it may propagate to other electrical devices or be radiated as RFI by the AC power system. However, the returning waveform 400 passes back through the EMI filter 100 where the impulse spike 410 is again attenuated by both filter stages 118, 114. The filtered waveform 400 is shown in FIG. 5b which shows waveform 400 substantially free of impulse spike 410 before returning to the AC power system.

By eliminating or substantially reducing any interference in the returning electricity, the electricity delivered to other electronic devices by the AC power system is considerably "cleaner." Therefore, highly susceptible digital devices are not affected by operation of "noisy" electrical appliances.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An outlet strip apparatus for filtering electromagnetic interference (EMI) from an appliance prior to said EMI being conducted into an AC power source, said apparatus comprising:
    a first input line, a second input line and a ground line for interconnection with said AC power source;
    a plurality of outlets for interconnecting said apparatus to at least one said electrical appliance, each said outlet having at least a first, second and third conductor connected to said first input line, second input line and ground line, respectively;
    at least one voltage surge absorption element disposed between said AC power source and said outlets, said element directly attached between at least two of said first input line said second input line and said ground line;
    a first set of EMI filters interconnected in series with said first input line including first and second capacitors interconnecting said first input line to said second input line and at least one inductor disposed between said capacitors; and
    a second set of EMI filters interconnected in series with said second input line and parallel with said first set of EMI filters, said second set of filters including at least one inductor disposed between said capacitors.

2. The apparatus of claim 1, wherein said multi-stage EMI filter is isolated in a metallic container and said metallic container is interconnected to said ground line.

3. The apparatus of claim 1, wherein said multi-stage EMI filter is operative to suppress common mode and differential mode electromagnetic interference.

4. The apparatus of claim 1, wherein said multi-stage EMI filter is operative to suppress electromagnetic interference in a frequency range between 25 kHz and 20,000 kHz.

5. The apparatus of claim 1, wherein said multi-stage EMI filter attenuates the amplitude of electromagnetic interference in a range between 3 dB and 65 dB.

6. The apparatus of claim 1, wherein said multi-stage EMI filter suppresses EMI in a frequency range of 500 kHz to 20,000 kHz and attenuates the amplitude of said EMI in a range between 55 and 65 dB.

7. The apparatus of claim 1, wherein said filter is operative to attenuate both impulse EMI and continuous EMI generated by said appliance.

8. The apparatus of claim 1, wherein said first input line is connectable to an AC power line and said second input line is connectable to an AC neutral line such that said apparatus is compatible with a 120 Volt AC power supply.

9. The apparatus of claim 1, wherein said first and second input lines are connectable to a first and second AC power lines such that said apparatus is compatible with a 220 Volt AC power supply.

10. The apparatus of claim 1, wherein said at least one voltage surge absorption element comprises a varistor, said varistor being normally non-conductive but becoming conducting when the voltage across said varistor exceeds a predetermined level.

11. The apparatus of claim 10, wherein said varistor is a metal oxide varistor.

12. A method for filtering electromagnetic interference (EMI) from an electrical appliance to prevent said EMI from being conducted into an AC power system while providing transient voltage surge suppression for said electrical appliance, said method comprising the steps of:
    interconnecting between an AC power source and an electrical appliance a multi-stage EMI filter enclosed within a metallic casing and comprising first and second EMI filters interconnected in series, and a transient voltage surge suppression element;
    diverting transient voltages from incoming electricity from said AC power source having a voltage amplitude greater than a predetermined level such that said transient voltages by-pass said electrical appliance;
    passing incoming electricity from said AC power source through said first and second EMI filters on a first input line to attenuate EMI contained within said incoming electricity prior to said electricity reaching said electrical appliance, wherein said first and second filters include first and second capacitors interconnecting said first input line to a second input line and at least one inductor disposed between said capacitors; and
    passing returning electricity from said electrical appliance through said first and second EMI filters on said second input line including at least one inductor disposed between said first and second capacitors such that EMI generated by said appliance is attenuated prior to re-introduction into said AC power source.

13. The method of claim 12, wherein said second passing step attenuates EMI in a frequency range between 25 kHz and 20,000 kHz.

14. The method of claim 12, wherein said second passing step attenuates the amplitude of said EMI in a range of between 3 dB and 65.

15. The method of claim 12, wherein said EMI filter and transient voltage surge suppression element are contained in an outlet strip apparatus, said outlet strip apparatus interconnecting said electrical appliance to said AC power source.

16. The apparatus of claim 12, wherein said second passing step attenuates EMI noise in a frequency range between 500 kHz and 20,000 kHz while attenuating the amplitude of said EMI noise in a range between 55 and 65 dB.

* * * * *